CIRCUIT ARRANGEMENT FOR FADING COLOR TELEVISION SIGNALS

Filed Sept. 7, 1965 4 Sheets-Sheet 1

Inventor:
Helmut Schönfelder
by Michael J. Striker
Attorney

July 9, 1968 H. SCHONFELDER 3,392,231

CIRCUIT ARRANGEMENT FOR FADING COLOR TELEVISION SIGNALS

Filed Sept. 7, 1965 4 Sheets-Sheet 2

Inventor:
Helmut Schönfelder
by Michael J. Striker
Attorney

Inventor:
Helmut Schönfelder
by Michael J. Striker
Attorney

Inventor:
Helmut Schönfelder
by Michael J. Striker
Attorney 3,392,231

CIRCUIT ARRANGEMENT FOR FADING COLOR TELEVISION SIGNALS

Helmut Schonfelder, Darmstadt, Germany, assignor to Fernseh G.m.b.H., Darmstadt, Germany Filed Sept. 7, 1965, Ser. No. 485,364
Claims priority, application Germany, Sept. 17, 1964, F 43,998
6 Claims. (Cl. 178—5.2)

ABSTRACT OF THE DISCLOSURE

The invention relates to a method and apparatus for fading color television signals wherein one color signal is generated at a central location and another is generated at a remote station and a color sub-carrier free running oscillator is controlled by a phase discriminator to ensure proper phasing of the two color signals.

The present invention relates to a circuit arrangement and to a method for fading composite color television signals and particularly to a circuit arrangement and a method for fading composite color television signals of the NTSC- or PAL-type.

In accordance with conventional television practice color television signals include color sub-carrier components and are generated in appropriate color coders. The phasing of the color sub-carrier components may be adjusted manually. In many cases, however, it is advantageous to effect the necessary adjustments automatically by comparing the phases of the color sub-carrier components either one with another or with the phase of a color sub-carrier reference signal and deriving a control voltage. This control voltage automatically produces a change in phase of one color sub-carrier and eliminates the phase difference.

In many practical cases one of the color sub-carrier components is transmitted over a transmission path changing its transmission characteristic. The changes in transmission characteristic may be effected by changes in temperature. For example, one color sub-carrier component may be transmitted over a microwave radio link of which the characteristic varies with time. One of the color sub-carrier components may also be transmitted over one of several parallel channels having different transmission characteristics. In this case the transmission characteristic of the overall transmission path depends on the characteristic of the particular channel being switched on. In all these cases the changing transmission characteristic of the transmission path results in phase errors causing improper fading of the television signals.

It is a major object of the present invention to provide a new and improved method and apparatus for fading composite color signals even when the color sub-carrier components are transmitted over a transmission path of which the characteristics alter.

It is a further object of the present invention to provide a novel method and apparatus for fading composite color signals of the NTSC- or PAL-type.

It is still a further object of the present invention to provide a novel method and apparatus for fading composite color signals of which one is generated within a central position and the other at a remote position, and in which a control voltage is transmitted from the central position to the remote position.

According to the present invention there is provided a circuit arrangement for fading composite color signals, at least one of said composite color signals being transmitted to a fader by way of a transmission path of which the characteristic may vary, comprising a phase discriminator comparing the phases of the color sub-carrier components of said composite color signals and being located after said transmission path—seen from the composite color signal being transmitted over said transmission path—and further comprising a free-running oscillator generating a color sub-carrier, said free-running oscillator being controlled by a control voltage derived by said phase discriminator in such a manner as to reduce any phase difference between said color sub-carrier components.

The circuit arrangement according to the invention provides the advantage that phase errors of the color sub-carrier components caused by the varying characteristic of the transmission path are measured at just that position at which its deleterious effect is a maximum. The circuit arrangement according to the invention is used with particular advantage when one of two composite color signals is produced at a central position and the other at a remote position. In such a case it is suitable to dispose the phase discriminator within the central position, preferably near the fader.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

Figure 4:
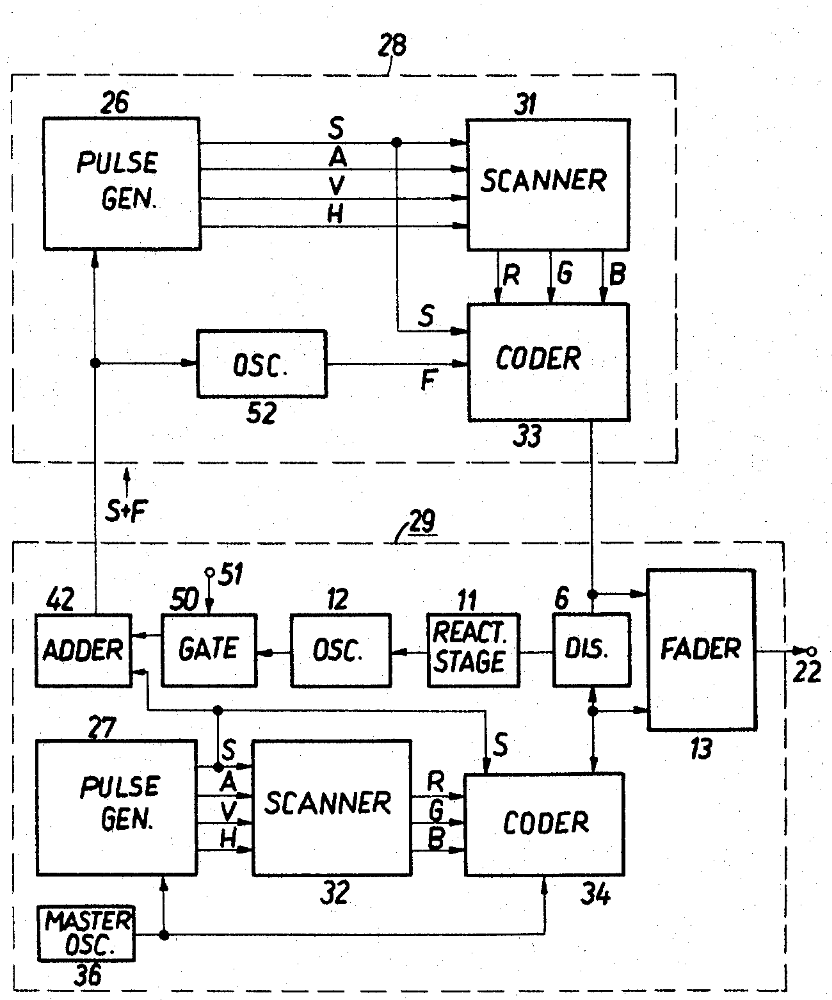
Figure 5:
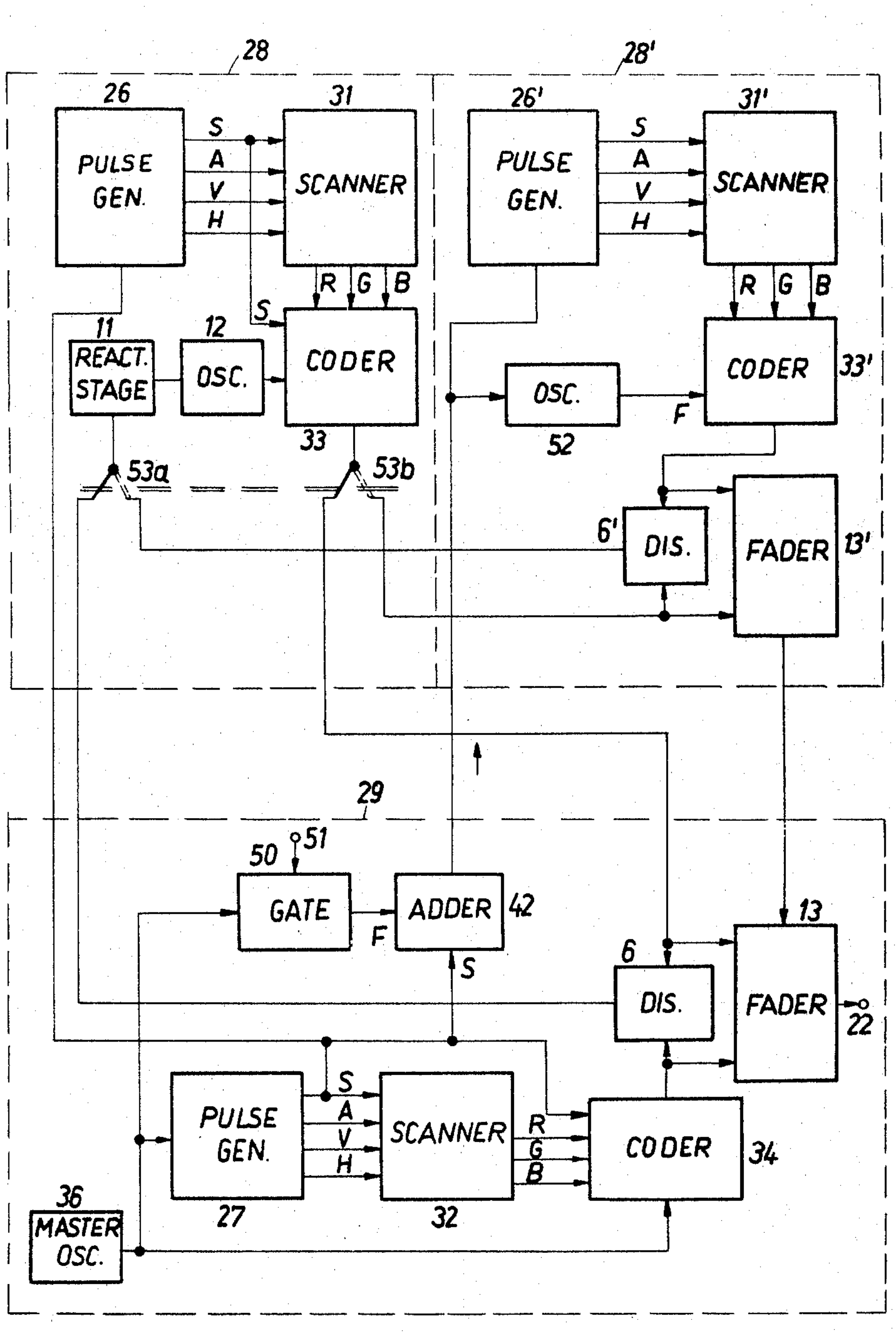

FIG. 4 is a block diagram of a circuit arrangement for the fading of two composite color television signals, of which one is generated within a central position and the other at a remote position, in which a color coder at the remote position is synchronized by means of color synchronizing signals transmitted to the remote position from the central position; and FIG. 5 is a block diagram of a circuit arrangement for the fading of three composite color television signals which are generated respectively at two remote positions and at a central position.

In all these drawings corresponding elements are designated by the same reference symbols.

Figure 1:
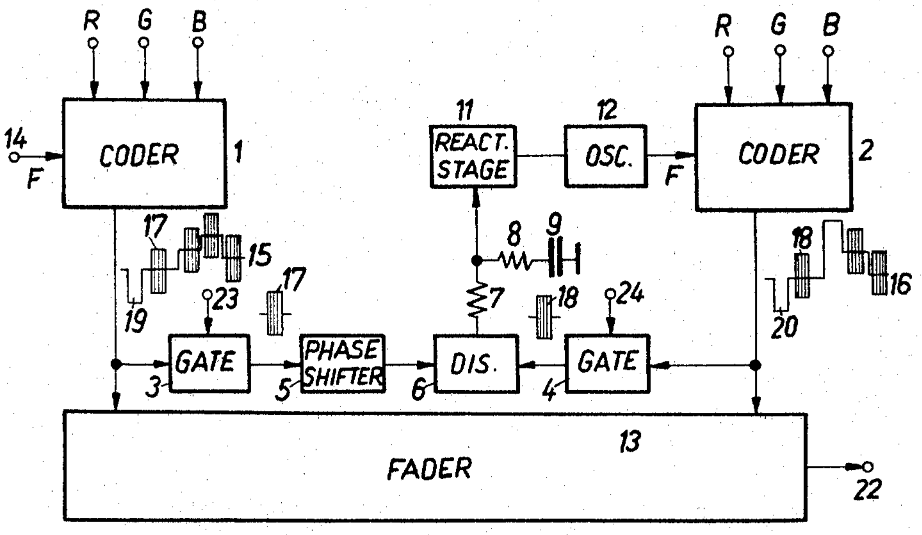
FIG. 1 is a basic circuit diagram of a circuit arrangement for the cross-fading of two composite color television signals.

The circuit arrangement according to FIG. 1 shows the coders 1, 2, the gates 3, 4, and the phase shifter 5, the phase discriminator 6, the resistors 7, 8, the condenser 9, the reactance stage 11, the sub-carrier oscillator 12 and the fader 13. The color signals R, G, B corresponding to the primary colors red, green and blue respectively are applied to both coders 1 and 2. The color sub-carrier F is applied via terminal 14 to coder 1 and from the output of the sub-carrier oscillator 12 to the coder 2. By means of these coders 1 and 2 composite color signals 15 respectively 16 are generated. These composite color signals 15 respectively 16 include color sub-carrier components 17 respectively 18 and horizontal sync pulses 19 respectively 20. These composite color signals 15, 16 are applied to the fader 13. By means of this fader 13 fade-ins, fadeouts, lap dissolves or wipe-outs or any combination of these can be made in a conventional manner. In this way at the output 22 of the fader 13 either one of these composite color signals or parts of both composite color signals are available.

Gates 3, 4 to which the composite color signals 15 respectively 16 from coders 1, 2 are respectively applied are controlled by pulses received at terminals 23, 24 respectively. The timing and duration of these pulses is such that gates 3, 4 open to allow the color sub-carrier components 17, 18 respectively to pass to the phase discriminator 6, in which these components 17, 18 are compared in phase with one another to derive a control voltage of which the magnitude and polarity represent the amount and direction of the phase difference between the compared signals. The control voltage thus derived is applied to the reactance stage 11, if necessary by way of a buffer stage (not shown). The reactance stage 11 controls the frequency of oscillator 12 in such a manner that any phase difference in the color sub-carrier components contained in composite color signals 15, 16 is reduced.

Figure 2:
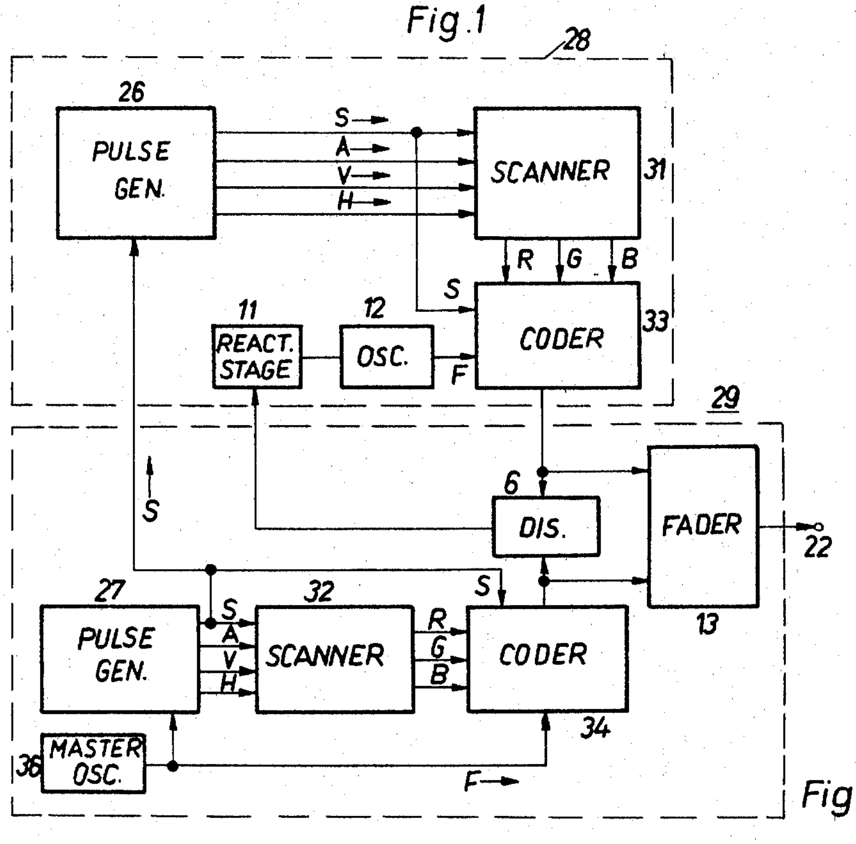
FIG. 2 is a block diagram of apparatus suitable for the fading of two composite color television signals of which one is generated within a central position and the other at a remote position, and in which a control voltage is transmitted from the central position to the remote position.

The circuit arrangement shown in FIG. 2 includes a pulse generator 26 located within a remote position denoted by broken line 28, and a central master pulse generator 27 located within a central position denoted by broken line 29. Each of these pulse generators yields a composite sync signal S, blanking pulses A, vertical sync pulses V and horizontal sync pulses H. Color scanners 31, 32, which may for example, be color television cameras, color slide scanners or color film scanners, are synchronized by pulse generator 26 and 27 respectively and each supply color signals R, G, B to an associated respective color coder 33, 34. To coder 33 there is also applied a color sub-carrier F developed by a free-running oscillator 12 controlled by a reactance stage 11 to which a control voltage is applied from the central position as will later be described. To coder 34 at the central position there is applied a color sub-carrier F developed by a master oscillator 36, which is also used to control the operation of the master pulse generator 27. The composite sync signal S developed by the master pulse generator at the central position is transmitted to the remote position and is there used to control the operation of the remote pulse generator 26.

To ensure phase synchronism of the color sub-carrier components the composite color signals developed by coders 33 and 34 are applied to a phase discriminator 6 in which the sub-carrier components of these composite signals are compared in phase with one another. In this way a control voltage is developed which is applied to reactance stage 11 at the remote position, thus controlling oscillator 12 in such a manner as to reduce any phase discrepancy between the two composite color signals such as may arise as the result of changes in the characteristics of the transmission path by means of which one of the composite color signals is transmitted from the output of coder 33 to the input of the phase discriminator 6. This phase discriminator 6 is located after said transmission path—seen from the composite color signal being transmitted from the output of coder 33 to the input of phase discriminator 6. The phase discrepancies which may arise are thus measured exactly at that position at which they are most deleterious, that is, at the inputs to the fader 13 in which the composite color signals may be faded, cross-faded or mixed to provide an output signal at terminal 22.

Figure 3:
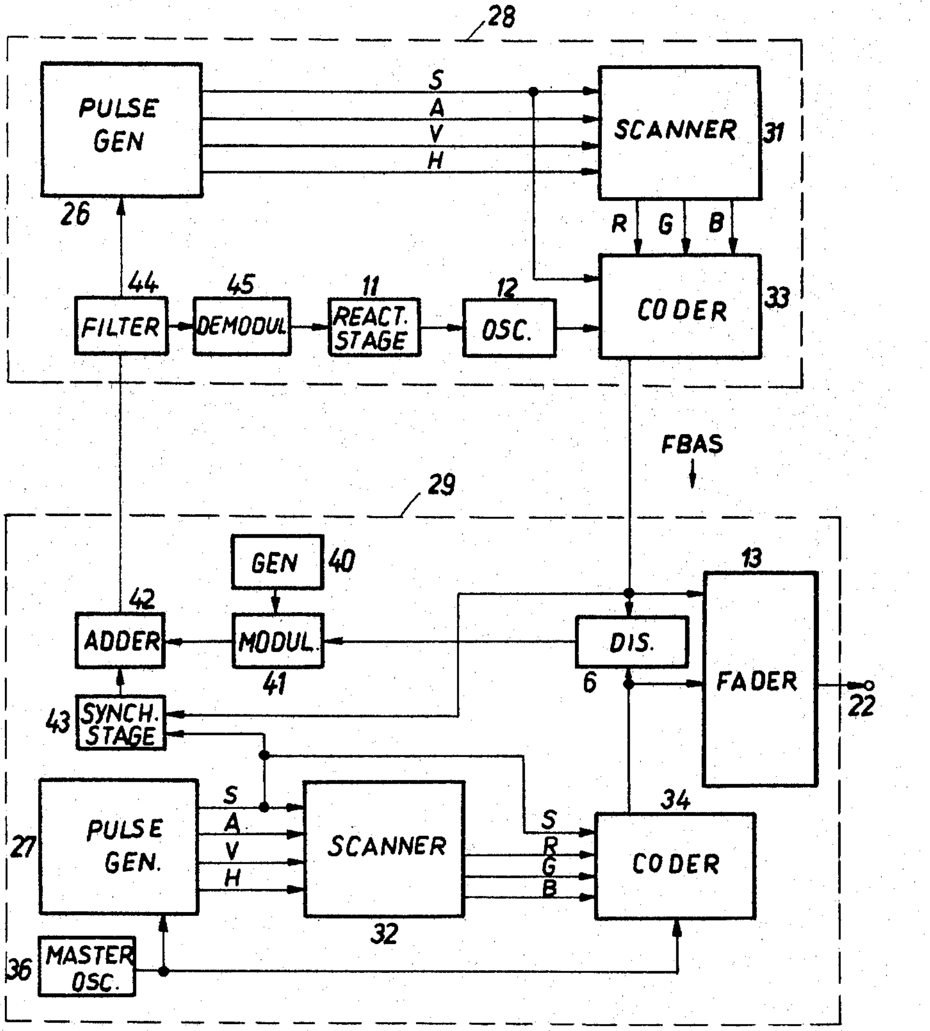
FIG. 3 is a block diagram of a circuit arrangement for the fading of two composite color television signals of which one is generated within a central position and the other at a remote position, and in which a control voltage is transmitted from the central position to the remote position as a frequency modulation of a carrier wave.

It will in many cases be inconvenient to transmit a direct control voltage from the central position 29 to the remote position 28. In such cases the arrangement shown in FIG. 3 may be adopted, in which the control voltage is transmitted as a modulation of a carrier frequency. The arrangements shown in FIG. 3 are for the most part similar to those used in the apparatus described above in relation to FIG. 2. In FIG. 3, however, a generator 40 is used to generate a sinusoidal signal at a frequency of, for example, 4 kc./s. which is applied to a modulator 41 in which it is modulated by the control voltage developed in phase discriminator 6. The modulated sinusoidal signal from modulator 41 is applied to an adding stage 42.

In a synchronizing stage 43 the composite sync signals S (derived from master pulse generator 27 and contained in the composite color signal FBAS from coder 33) are compared and as a result of this comparison there is derived a further control voltage which is used to effect a phase rotation of a sinusoidal signal whenever the two composite signals do not coincide in phase. This sinusoidal signal may conveniently have a frequency which is a multiple or submultiple of the horizontal frequency and can be developed within synchronizing stage 43. This sinusoidal signal may have a frequency of 7.8 kc./s. and is likewise applied to adding stage 43, and the composite signal resulting at the output of adding stage 43 is transmitted to the remote position. By means of an appropriate filter device 44 the two sinusoidal signals transmitted to the remote position are separated; specifically the 7.8 kc./s. sinusoidal signal component is applied to the pulse generator 26 at the remote position to control its operation, and the 4 kc./s. sinusoidal signal is applied to the demodulator 45, from which the demodulated control voltage is applied to control the reactance stage 11 and thus the frequency of the color sub-carrier oscillator 12, so as to produce the desired phase coincidence between the color sub-carrier components compared in phase discriminator 6.

Thus any changes in the relative phases of the color sub-carrier components applied to fader 13 which may result from changes in the characteristics of the transmission path by which signals are transmitted from the output of coder 33 to the input of phase discriminator 6 are automatically corrected.

In the circuit arrangement shown in FIG. 4 the color sub-carrier oscillator 12 controlled by the control voltage developed in phase discriminator 6, and the reactance stage 11 used to effect this control, are situated within the central position 29, in contrast to the arrangement described in relation to FIGS. 2 and 3, where these elements are disposed at the remote position 28. The color sub-carrier frequency signal from oscillator 12 is applied to a gate 50 to which are applied from a terminal 51 pulses such that the gate is opened to the passage of signals from oscillator 12 only during the color sub-carrier components (burst). These burst signals are applied to an adding stage 42, to which is also applied the composite sync signal S from master pulse generator 27. Thus there is transmitted to the remote position a composite signal $S+F$ consisting of the horizontal, vertical and color synchronizing signals. At the remote position this composite signal $S+F$ is employed on the one hand to synchronize the remote pulse generator 26 and on the other hand to excite an oscillator circuit 52, tuned to the color sub-carrier frequency, from which the color sub-carrier F is applied to the coder 33. This color sub-carrier is thus kept in phase synchronism with the controlling burst signal received from the master pulse generator.

If, as a result of variations in the characteristics of the transmission path by means of which the composite color signal is transmitted from the output of the coder 33 to the input of the discriminator 6, the color sub-carrier components of the two signals applied to fader 13 are found by phase discriminator 6 to be asynchronous, then the control voltage developed by the discriminator adjusts the frequency of oscillator 12 in such a manner as to reduce the phase discrepancy. This phase discriminator 6 is located after said transmission path—seen from the composite color signal being transmitted from the output of coder 33 to the input of phase discriminator 6.

The circuit arrangement shown in FIG. 5 includes a central position 29, a first remote position 28 and a second remote position 28'. The second remote position 28' is equipped in the same manner as the first remote position 28 in that each contains pulse generator 26', a color scanner 31′ and a coder 33′. Additionally, the second remote position 28′ is provided with a fader 13′ having two inputs to which signals from color coders 33, 33′ may be applied. A phase discriminator 6′ is fed with the input signals to this fader 13′ yielding a control voltage related to any phase discrepancy between the color sub-carrier components of the applied signals.

Composite sync signals S developed by the master pulse generator 27 at the central position 29 are applied to an adding stage 42 in which they are added to gated color sub-carrier F applied to adder 42 from a gate circuit 50, which is fed with the color sub-carrier from master oscillator 36 and is controlled by suitable pulses received at terminal 51 so that bursts of color sub-carrier frequency are transmitted to the second remote position together with the synchronizing signals. At the second remote position the color bursts from the central position are used to excite a resonant circuit 52, tuned to the color sub-carrier frequency and thus yielding to coder 33′ an appropriately phased color sub-carrier F.

The first remote position 28 includes a color sub-carrier oscillator 12, controlled in frequency by a reactance stage 11 to which a control voltage is applied either from the central position 29 or from the second remote position 28′, in accordance with the setting of contacts 53*a* of a two-way switch 53. Contacts 53*b* of switch 53 apply output signals from coder 33 either to the fader 13 (contacts 53*a* and 53*b* shown in full line), in which case contacts 53*a* ensure that the control signal for reactance stage 11 is taken from phase discriminator 6, or (contacts 53*a* and 53*b* shown in broken line) to fader 13′, in which case contacts 53*a* ensure that the reactance stage 11 is controlled by the control signal developed by phase discriminator 6′.

In this manner, any change in the characteristics of the transmission path by which signals from the output of coder 33 are fed to the fader 13, or in that transmission path by which signals from the output of coder 33 are fed to the fader 13′ are automatically compensated.

While the invention has been illustrated and described as embodied in an arrangement for fading composite color signals it is not intended to be limited to the details shown, since various modifications and structural changes may be made without departing in any way from the spirit of the present invention.

What is claimed as new and desired to be secured by Letters Patent is:

1. Circuit arrangement for fading a first and second composite color signal including a color sub-carrier component each comprising in combination: a first and a second scanning device generating a first and a second set of color signals respectively corresponding to the primary colors red, green and blue; a first and a second color coder delivering said first and said second composite color signal respectively; connection means applying said first and said second set of color signals to said first and said second color coder respectively; a fader having two input leads and one output lead, said fader delivering via its output lead desired parts of input signals applied to its two input leads; connection means delivering said first composite color signal to one of said input leads of said fader; a transmission path changing its transmission characteristic; connection means applying said second composite color signal from said second coder via said transmission path to the other input lead of said fader; a first gate and a second gate being controlled by pulses opening said first gate and said second gate respectively during said color sub-carrier components respectively; a phase discriminator having two input leads and one output lead and generating a control voltage depending upon the phase difference of signals applied to its two input leads; a reactance stage; a free-running oscillator generating a color sub-carrier signal; connection means delivering said first composite color signal to the input lead of said first gate; connection means delivering said second composite color signal via said transmission path to the input lead of said second gate; connection means connecting the output lead of said first gate and said second gate respectively to said input leads respectively of said phase discriminator; a reactance stage; connection means connecting the output lead of said phase discriminator to the input lead of said reactance stage; connection means connecting the output lead of said reactance stage to the input lead of said free-running oscillator; and connection means applying the color sub-carrier signal of said free-running oscillator to said second color coder.

2. Circuit arrangement according to claim 1, said first scanning device, said first color coder, said phase discriminator, said fader, said first gate, said second gate being situated at a central position and said second scanning device, said second color coder, said reactance stage, said oscillator being situated at a remote position.

3. Circuit arrangement according to claim 2 comprising a generator generating a sinusoidal signal having a predetermined frequency; a modulator; connection means applying said sinusoidal signal to said modulator; connection means applying said control signal of said phase discriminator to said modulator; a demodulator; connection means applying the modulated sinusoidal signal of said modulator to the input lead of said demodulator; and connection means applying the demodulated sinusoidal signal to control said oscillator.

4. Circuit arrangement according to claim 1 comprising a central position providing said first scanning device, said first color coder, said phase discriminator, said first gate, said second gate, said fader, said reactance stage, said oscillator, a third gate being opened during said color sub-carrier components, a first master pulse generator generating a composite sync signal being composed of horizontal and vertical sync pulses, an adder having two input leads and one output lead additively mixing signals applied to its input leads; a remote position providing said second scanning device, said second color coder, a resonant circuit being tuned to sub-carrier frequency, a second master pulse generator; connection means connecting the output lead of said free-running oscillator to the input lead of said third gate; connection means connecting the output lead of said third gate to one input lead of said adder; connection means applying said composite sync signal to the other input lead of said adder; connection means connecting the output lead of said adder to the input lead of said second master pulse generator and to the input lead of said resonant circuit; and connection means connecting the output lead of said resonant circuit to said second color coder.

5. Circuit arrangement for fading three composite color signals including a color sub-carrier component each comprising, in combination: a central scanning device, a first remote scanning device and a second remote scanning device generating sets of color signals each corresponding to the primary colors red, green and blue, and being situated at a central position, at a first remote position and at a second remote position respectively; a central color coder, a first remote color coder and a second remote color coder respectively delivering said three composite color signals respectively and being situated at said central position, at said first remote position and at said second remote position respectively; a central fader and a remote fader having three respectively two input leads and one output lead each and delivering via its output lead respectively desired parts of signals applied to its three respectively two input leads; said central and remote fader being situated at said central position and at said second remote position respectively; a first and a second switch being coupled and being both in its first or both in its second switch position; a first and second transmission path changing its transmission characteristics; a central and a remote phase discriminator having two input leads and one output lead each and generating a control voltage each depending upon the phase difference of signals applied to its two input leads respectively, said central and remote phase discriminator being situated at said central position and at said second remote position respectively; a reactance stage being situated at said first remote position; a free-running oscillator generating a color sub-carrier signal and being situated at said first remote position; a resonant circuit being tuned to the color sub-carrier frequency and being situated at said second remote position; connection means connecting the output lead of said central phase discriminator via said first switch in its first position to the input lead of said reactance stage; connection means connecting the output lead of said remote phase discriminator via said first switch in its second position to said input lead of said reactance stage; a first gate, a second gate, a third gate and a fourth gate being controlled by pulses opening said first, said second, said third, said fourth gate respectively during said color sub-carrier components respectively; connection means connecting the output lead of said first remote color coder via said second switch in its first position and via said first transmission path on the one hand to one input lead of said central fader and on the other hand to one input lead of said first gate; connection means connecting the output lead of said first remote color coder via said second switch in its second switch position on the one hand to one input lead of said remote fader and on the other hand to one input lead of said third gate; connection means connecting the output lead of said central color coder on the one hand to a second input lead of said central fader and on the other hand to the input lead of said second gate; connection means connecting the output leads of said first and second gate respectively to the input leads of said central phase discriminator; connection means connecting the output lead of said remote fader to a third input lead of said central fader; connection means connecting the output lead of said second remote color coder via said second transmission path on the one hand to the other input lead of said remote fader and on the other hand to the input lead of said fourth gate; connection means connecting the output leads of said third and fourth gate respectively to the input leads of said remote phase discriminator; connection means connecting the output lead of said reactance stage to said free-running oscillator; connection means connecting the output lead of said free-running oscillator to said first remote color coder; a first master pulse generator generating a composite sync signal being composed of horizontal and vertical sync pulses, said first master pulse generator being situated at said central position; a second master pulse generator being situated at said second remote position; an adder having two input leads and one output lead additively mixing signals applied to its input leads; a fifth gate being opened during said color sub-carrier components; a generator generating a sub-carrier frequency; connection means applying said sub-carrier frequency via said fifth gate to said adder; connection means connecting the output lead of said adder on the one hand to said second master pulse generator and on the other hand to said resonant circuit; and connection means connecting the output lead of said resonant circuit to the input of said second remote coder.

6. Method for fading a first and a second composite color signal including a first and a second color sub-carrier component respectively, comprising the steps of scanning objects and generating a first and a second set of color signals respectively corresponding to the primary colors red, green and blue; applying said first and second set of color signals to a first and second color coder respectively and generating said first and second composite color signal; delivering said first composite color signal to one input lead of a fader; applying said second composite color signal from said second color coder to one end of a transmission path with changing transmission characteristic; applying said second composite color signal and said second sub-carrier component via said transmission path to the other end of said transmission path and to the other input lead of said fader; generating a control voltage depending upon the phase difference of said first color sub-carrier component and said second sub-carrier component from said other end of said transmission path; applying said control voltage to a reactance stage and controlling a free-running oscillator in such a way that any phase difference between said color sub-carrier components will be reduced.

No references cited.

ROBERT L. GRIFFIN, *Primary Examiner.*

R. MURRAY, *Assistant Examiner.*